L. M. LONG.
COMBINATION WELL CLEANER.
APPLICATION FILED AUG. 23, 1917.

1,257,260.

Patented Feb. 19, 1918.

Inventor
L. M. Long
By H. S. Hie
Attorney

UNITED STATES PATENT OFFICE.

LUTHER M. LONG, OF FYFFE, ALABAMA.

COMBINATION WELL-CLEANER.

1,257,260.   Specification of Letters Patent.   Patented Feb. 19, 1918.

Application filed August 23, 1917. Serial No. 187,739.

*To all whom it may concern:*

Be it known that I, LUTHER M. LONG, a citizen of the United States, residing at Fyffe, in the county of Dekalb, State of Alabama, have invented a new and useful Combination Well-Cleaner; and I do hereby declare the following to be a full, clear, and exact description of the invention, such as will enable others skilled in the art to which it appertains to make and use the same.

The present invention relates to a grab or fishing tool for wells, and has for its object to provide a device of this character which embodies novel features of construction whereby it can be readily lowered into a well and will operate in an effective manner to remove any obstruction which may have become lodged in the well.

Further objects of the invention are to provide a fishing tool which is comparatively simple and inexpensive in its construction, which can be easily manipulated, which can be readily carried from place to place and inserted in any well, and which can be adjusted and manipulated without the use of any auxiliary tools.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
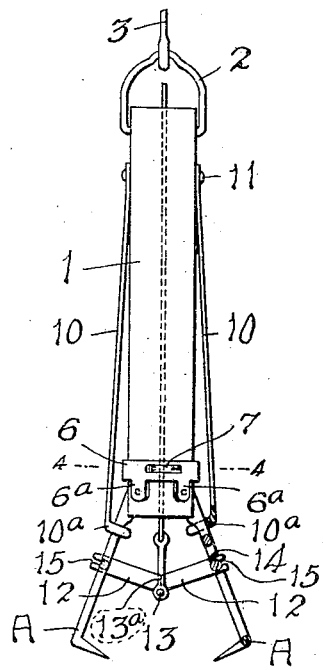
Figure 1 is a side elevation of a well cleaning device constructed in accordance with the invention, the jaws being shown in an extended position, and portions being broken away to more clearly illustrate the details of construction.
Figure 2:
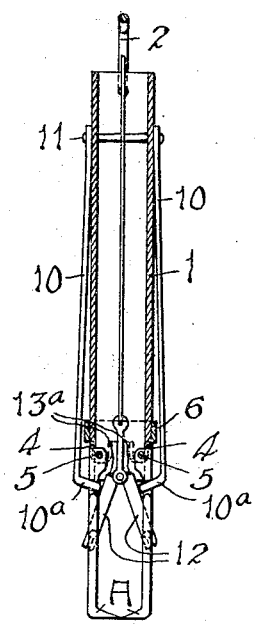
Fig. 2 is a similar view showing the jaws in a closed position, and showing the tubular stock in section.
Figure 3:
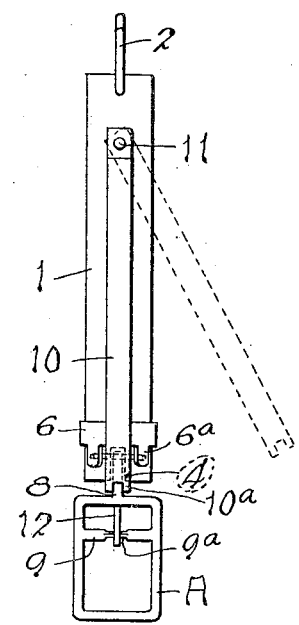
Fig. 3 is a side elevation of the device looking at the same from a position at right angles to that shown by Fig. 1.
Figure 4:
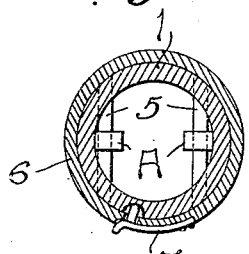
Fig. 4 is a horizontal sectional view on the line 4—4 of Fig. 1.
Figure 5:
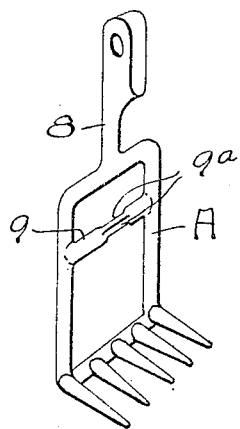
Figs. 5, 6 and 7 are detail views of the various forms of jaws adapted to be used with the device.
Figures 6, 7, 8:
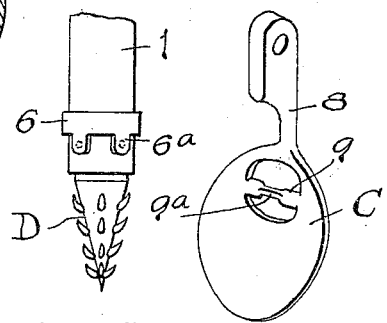
Fig. 8 illustrates a further modification.

Referring to the drawings, which illustrate one embodiment of the invention, the numeral 1 designates a tubular stock which has an elongated formation, and is of such a size as to be conveniently lowered into the well. The upper end of the tubular stock is provided with a small bail 2 which provides a means for attaching a suspending cable 3 which is used in raising and lowering the tool. The lower end of the stock is slotted upon opposite sides thereof, as indicated at 4, the pivot ends of opposed grab means or jaws A being received within these slots 4 and engaged by transverse pivot pins 5 which are removably inserted in position within the stock. It is contemplated to provide several sets of the jaws, the different sets of jaws being interchangeable and having different shapes or configurations so that a set of jaws can be selected which is best suited for the removal of the particular obstruction in the well. The pivot pins 5 are arranged to slip easily into and out of position, so that any selected set of gripping jaws can be applied to the stock. If desired, a ring 6 may be rotatably mounted upon the end of the stock and formed with wings 6ª adapted to be moved over and away from the ends of the openings receiving the pivot pins 5, thereby providing a means for retaining the pivot pins in operative position when the tool is in use. A suitable latch 7 is provided for holding the ring 6 in operative position, and when it is desired to substitute a different set of gripping jaws it is merely necessary to release the latch 7 and rotate the ring 6 into position to uncover the ends of the pivot pins 5 whereupon the latter can be pushed out of position.

The jaws A are shaped so that they can be advantageously used for removing small objects such as sticks, pocket knives, and the like, the jaws B being better adapted for removing a bucket or the like, while the jaws C are spoon shaped and are well adapted for catching hold of small articles such as watches, rings, coins and the like. These different sets of jaws are adapted to be used interchangeably, and each of the jaws is formed with a shank 8 and a cross bar 9, the upper ends of the shanks being adapted to be inserted in the slotted portions 4 of the stock and to be engaged by the pivot pins 5. These shanks 8, when the jaws are operatively applied to the stock, are loosely engaged by the forked ends 10ª of spring strips 10 which extend longitudinally along opposite sides of the tubular stock, being secured thereto at their upper ends by a transverse pin 11. The extremities of this pin extend through openings in the spring strips and hold the spring strips tightly against the sides of the stock, although the strips are adapted to be swung laterally about the transverse pin 11 as a pivot when the forked ends 10ª thereof are disengaged from the gripping jaws. When the tool is in operation, however, the forked ends 10ª of the spring strips engage the gripping jaws in such a manner that the spring strips are held against lateral swinging movement. These spring strips tend to swing the gripping jaws toward each other, so that when the jaws are released they will be caused to grip any object which may have been between them, thereby enabling the object to be drawn to the top of the well.

A pair of hinged trip levers 12 are interposed between the jaws for holding them in an open position against the action of the spring strips 10 until they are in proper position to grip the object which it is desired to withdraw from the well. These trip levers 12 are pivotally connected at 13, and are provided at their outer ends with pivot openings 14 and slots 15 extending from the pivot openings through the ends of the levers. These pivot openings 14 are adapted to engage the cross bars 9 of the jaws, said cross bars being formed with flat portions 9ª adapted to be inserted through the slots 15 when the trip levers and gripping jaws are brought into a predetermined angular relation, this relation being one that is never assumed when the tool is in use. One set of trip levers can thus be used in connection with any selected set of the gripping jaws, being adapted to be placed in engagement with the cross bars 9 of the gripping jaws before the jaws are applied to the stock. The pivot ends of the trip levers are formed with shoulders 13ª which engage each other to limit the pivotal movement of the levers when the pivot point 13 is swung downwardly slightly below a dead center position. The trip levers will then lock the jaws in an open position, although the object to be gripped and withdrawn from the well will engage the trip levers when the tool has been lowered to the proper depth, swinging the pivotal connection of the trip levers upwardly above a dead center position, whereupon the spring strips 10 will force the jaws toward each other and cause them to grip the object, after which it can be lifted from the well. If a positive trip means is desired, a yoke 15' may be attached to the pivot 13 of the trip levers and a cord 16 connected to the yoke, said cord extending upwardly through the well so that the operator can positively trip the jaws when they are in position to engage the object which it is desired to remove from the well.

Under some conditions it may be desired to substitute a pointed head D for the gripping jaws, said pointed head being adapted to pierce a block of wood or the like for the purpose of enabling it to be readily lifted out of the well.

Having thus described the invention, what I claim as new and desire to secure by Letters Patent, is:—

1. A fishing tool for wells including an elongated stock, suspending means at the upper end of the stock, a pair of opposed jaws pivotally connected to the lower end of the stock, spring strips extending longitudinally of the stock, the lower ends of the strips having a loose engagement with the jaws, and a fastening member connecting the upper ends of the strip to the stock and holding them against the sides of the stock, but permitting them to swing laterally away from the jaws when the free ends of the strips are disengaged therefrom.

2. A fishing tool for wells including an elongated stock, suspending means at the upper end of the stock, a pair of opposed jaws pivotally connected to the lower end of the stock, spring strips extending longitudinally of the stock and having the lower ends thereof forked to straddle and loosely engage portions of the jaws, and a fastening member connecting the upper ends of the strips to the stock and holding them against the sides of the stock, but permitting them to swing laterally away from the jaws when the forked ends of the strips are disengaged therefrom.

3. A fishing tool for wells including an elongated stock, suspending means at the upper end of the stock, a pair of opposed jaws pivotally connected to the lower end of the stock, springs engaging the jaws and normally tending to swing them toward each other, and hingedly connected trip levers arranged between the jaws for holding them apart.

4. A fishing tool for wells, including an elongated stock, suspending means at the upper end of the stock, a pair of opposed jaws at the lower end of the stock, removable pivot pins detachably connecting the jaws to the stock, and a retaining ring rotatably mounted upon the stock for holding the removable pivot pins in position.

5. A fishing tool for wells, including an elongated stock, suspending means at the upper end of the stock, a pair of opposed jaws at the lower end of the stock, removable pivot pins for detachably connecting the jaws to the stock, a retaining ring rotatable upon the stock and formed with wings for retaining the pivot pins in operative position, and latch means for holding the retaining ring in position.

In testimony whereof I have signed my name to this specification in the presence of two subscribing witnesses.

LUTHER M. LONG.

Witnesses:
J. L. POPE,
J. A. WAKELEY.

Copies of this patent may be obtained for five cents each, by addressing the "Commissioner of Patents, Washington, D. C."